(12) United States Patent
Belykh et al.

(10) Patent No.: US 7,304,008 B2
(45) Date of Patent: Dec. 4, 2007

(54) THERMOCHROMIC MATERIAL

(75) Inventors: Anna Vasilievna Belykh, St.-Petersburg (RU); Alexandr Mikhailovich Efremov, St.-Petersburg (RU); Mikhail Dmitrievich Mikhailov, St.-Petersburg (RU)

(73) Assignee: Eurokera, Chateau Thierry (FR)

( * ) Notice: Subject to any disclaimer, the term of this patent is extended or adjusted under 35 U.S.C. 154(b) by 0 days.

(21) Appl. No.: 10/477,978

(22) PCT Filed: May 15, 2001

(86) PCT No.: PCT/RU01/00196

§ 371 (c)(1),
(2), (4) Date: May 17, 2004

(87) PCT Pub. No.: WO02/092721

PCT Pub. Date: Nov. 21, 2002

(65) Prior Publication Data

US 2004/0182284 A1    Sep. 23, 2004

(51) Int. Cl.
*C03C 8/14*    (2006.01)
(52) U.S. Cl. ............... 501/32; 501/94; 501/126; 501/134; 501/135
(58) Field of Classification Search ........... 501/32, 501/134, 135, 126, 94
See application file for complete search history.

(56) References Cited

U.S. PATENT DOCUMENTS 3,954,479 A * 5/1976 Jahn ..................... 501/32
4,722,510 A * 2/1988 Kobayashi et al. ...... 252/408.1

FOREIGN PATENT DOCUMENTS

| EP | 370683 A | * | 5/1990 |
| JP | 01090516 A | * | 4/1989 |
| JP | 02-022144 | | 1/1990 |
| JP | 04-140622 | | 5/1992 |
| JP | 08169726 A | * | 7/1996 |
| JP | 09227214 A | * | 9/1997 |

* cited by examiner

*Primary Examiner*—David M. Brunsman
(74) *Attorney, Agent, or Firm*—Siwen Chen

(57) ABSTRACT

Thermochromic material comprising a thermochromic component and a binder, wherein the thermochromic component is crystal phases based on oxides of heavy metals of I, II, III, IV, V, VI, VII, VIII groups of the Periodic System selected from the group consisting of compounds of the following general formulae:

(i) $(Bi_2O_3)_{1-z}(M_xO_y)_z$ where z=0–0.5, wherein M is selected from the group consisting of heavy, alkali, alkaline earth metals and mixtures thereof;

(ii) $(M_xO_y)_m(Bi_2O_3)_n Nb(Ta)_2O_5$, where m=0–1, n=1–2, wherein M is selected from the group consisting of heavy, alkali, alkaline earth metals and mixtures thereof;

(iii) $(M_xO_y)_m(Bi_2O_3)_n Mo(W)O_3$ where m=0–1, n=0–12, wherein M is selected from the group consisting of alkali, alkaline earth, heavy metals and mixtures thereof, (iv) $(M_xO_y)_m(Me_xO_y)_n Mo(W,Cr)O_3$ where m=0–1, n=0–1, wherein M is selected from the group consisting of alkali/alkaline earth, heavy metals and mixtures thereof, and Me is a heavy metal;

(v) $(M_xO_y)_m(Me_xO_y)_n Nb(Ta)_2O_5$, where m=0–1, n=0–1, wherein M is selected from the group consisting of alkali, alkaline earth, heavy metals and mixtures thereof, and Me is selected from the group consisting of Cu(II), Mn(II), Mn(III), Co(II), Ni(II), Cr(III), the ratio in terms of weight percentage of thermochromic component versus binder being from 2:98 to 98:2, and use of compounds (i) to (v) as thermochromic components are disclosed.

16 Claims, 6 Drawing Sheets a: reflectance spectrum of thermochromic compound at two temperatures;
b: reflectance spectrum of pigment;
c: reflectance spectrum of the mixture thereof at two temperatures.

THERMOCHROMIC MATERIAL

This application is a 371 of PCT/RU01/00196, filed May 15, 2001.

This invention relates to thermochromic materials, in particular, thermochromic coatings, change of color in which may be used for temperature indication. One of the fields for thermochromic materials application is household appliances with coating of thermochromic materials. The use of thermochromic materials permits to simply and efficiently warn a customer about danger of touching a certain portion of an article.

Requirements to thermochromic coatings of household appliances are as follows:

- The coating should signal about temperature of the surface within the range of from 100 to 400° C., which may cause a burn. Higher temperature, for instance, on cooking top of stove surface may be felt on account of heat radiation or visible red color of the surface.
- Change of color should be reversible in the heating cycles—cooling without effects of aging and solarization (discoloration).
- The coating should be stable up to maximum operation temperature (700° C. for cooking tops, 400° for other devices).
- The coating should meet sanitary engineering requirements and norms in respect of toxicity.

With such requirements the art-known thermochromic materials based on organic compounds and liquid crystals cannot be used, since they are not stable at high (up to 700° C.) temperatures, therefore they are not considered in the background of the invention.

Known in the art are thermochromic materials on the basis of cadmium and mercury sulfides and selenides as thermochromic components and lead-silicate enamels (U.S. Pat. No. 5,772,328 and No. 5,499,597) or borosilicate glass (U.S. Pat. No. 4,983,810) as a binder. The art-known thermochromic materials permit to obtain coatings stable to temperatures up to 700° C. However, in accordance with the current norms the coatings on their base cannot be used for applying onto the surfaces of household appliances because of high toxicity rates of cadmium and mercury.

The solution disclosed in U.S. Pat. No. 4,983,810 is believed to be the closest to the claimed one, in compliance with this solution the thermochromic materials comprises:

- as thermochromic component the compounds of formula $CdS_{1-x}Se_x$, wherein $x=0-0.8$, or formula $Zn_{1-y}Mn_yO$ wherein $y=0.05-0.15$;
- as binder glasses or glass ceramic, in particular, borosilicate glass;
- as non-thermochromic or low-thermochromic compound the color of which is close to that of thermochromic component, for instance, $Pb_3(SbO_4)_2$ or $ZrO_2$ alloyed with praseodymium. This component is used as the inner standard of color transition in the thermochromic component upon heating.

It was already mentioned above that cadmium compositions are toxic and cannot meet the requirements of sanitary engineering norms in respect of toxicity valid for household appliances. Regarding the compound $Zn_{1-y}Mn_yO$ according to the Specification it is stable upon heating to 400° C. only and has no full reversibility of color transition due to oxidation.

The purpose of this invention consists in creation of a thermochromic material, non toxic, the color of which is reversible at temperature change from room temperature to 400° C., and, of which the color transition should permit to reflect temperature changes of less than by 200° C., and which is stable when heated to 700° C.

This purpose is attained by that a thermochromic material is disclosed which contains as a thermochromic component based on crystal of heavy metals of I, II, III, IV, V, VI, VII, VIII groups of the Periodic System, and as the binder—mixtures or pure components on the basis of silicates, borates, phosphates of alkali or alkaline earth metals, the weight ratio of the thermochromic component to binder being from 2:98 to 98:2.

For intensification of thermochromic features the thermochromic materials may additionally comprise a thermostable non-thermochromic or low-thermochromic component, of which the area of diffusion reflection maximum lies in the same or is close to the spectral range where the temperature-related change of diffusion reflection spectrum of the basic thermochromic component lies.

A distinctive feature of the claimed invention is the thermochromic component which is selected from the group of the following compounds:

(i) Based on bismuth oxide compound of the general formula $(Bi_2O_3)_{1-z}(M_xO_y)_z$ at $z=0-0.5$, wherein M is selected from the group consisting of heavy, alkali, alkaline earth metals and mixtures thereof. For instance, M is Zr(IV), Hf(IV), Sn(II), Sn(IV), Nb(V), Ta(V), Mo(VI), W(VI), Cr(III), Cr(VI), Mn(II), Fe(III), Co(II), Ni(II), Pb(II), Ca(II), Sr(II), Ba(II), Li, Na, K, Rb, Cs.

(ii) Niobates and tantalates of general formula $(M_xO_y)_m(Bi_2O_3)_nNb(Ta)_2O_5$, with $m=0-1$, $n=1-2$, wherein M is selected from the group consisting of heavy, alkali, alkaline earth metals and mixtures thereof. For instance, M is Na, K, Rb, Cs, Mg, Ca, Sr, Ba, Pb(II), Co(II), Ni(II), Cr(III), Cu(II), Cu(I).

(iii) Molibdates and tungstates of general formula $(M_xO_y)_m(Bi_2O_3)_nMo(W)O_3$ at $m=0-1$, $n=0-12$, wherein M is selected from the group consisting of alkali, alkaline earth, heavy metals and mixtures thereof. For instance, M is Na, K, Rb, Cs, Mg, Ca, Sr, Ba, Sn, Ti, Zr, Pb(II), Mn(II), Mn(III), Co(II), Ni(II), Cr(III), Cu(II).

(iv) Chromates, molibdates, tungstates of general formula $(M_xO_y)_m(Me_xC_y)_nMo(W,Cr)O_3$ at $m=0-1$, $n=0-1$, wherein M is selected from the group consisting of alkali, alkaline earth, heavy metals and mixtures thereof, Me is a heavy metal. For instance, M is Na, K, Pb, Cs, Mg, Ca, Sr, Ba, Sn, Ti, Zr, Pb(II), and examples of Me are Cu(II), Mn(II), Mn(III), Co(II), Ni(II), Cr(III).

(v) Niobates and tantalates of general formula $(M_xO_y)_m(Me_xO_y)_nNb(Ta)_2O_5$, at $m=0-1$, $n=0-1$, wherein M is selected from the group consisting of alkali, alkaline earth, heavy metals and mixtures thereof, and Me is selected from the group consisting of Cu(II), Mn(II), Mn(III), Co(II), Ni(II), Cr(III). For instance, M is Na, K, Rb, Cs, Mg, Ca, Sr, Ba, Sn, Ti, Zr, Pb(II).

An example of stable non-thermochromic or low thermochromic pigment is blue cobalt $CoAl_2O_4$ or $CoWO_4$ or $Co_{1-x}Zn_xWO_4$ or $CoMoO_4$ for the thermochromic compound $Bi_2O_3$ or the compounds are selected from (ii) and (iii). Another example is the mixture of $(Bi_2O_3)_x(CrO_3)_x$ as a thermochromic component and $Cr_2O_3$ as thermostable pigment. The ratio of the quantity of thermochromic compound to thermochromic pigment is in the range of from 50:1 to 1:30.

Traditionally, the phenomenon of thermochromism is connected with phase transition in solid sate (polymorphic transformation). Typical representatives of solid thermochromic compounds of this type are some of iodomercurates, iodides of tallium, mercury, silver, which have clear and reversible color change in the point of phase transition. (J. H. Day. Thermochromism of Inorganic Compounds. Chem. Rev., 68 (1968), 669; K. Sone, Y. Fukuda. Inorganic Thermochromism. Springer-Verlag, Berlin e.a., 1987). These compounds have high contrast of color changes with temperature, but they are stable only at low temperatures. For most thermochromic compounds, such as $Ag_2HgI_4$ maximum allowable temperature does not exceed 200° C. (D. Negoin, T. Rosu. Electric, thermal and thermochromic properties of $M_xHgI_4$—type compounds. Rev. Chem., 45 (1994), 201). It is not sufficient for application of thermochromic coatings in such articles as kitchen ovens, temperature of the cooking-top in which may reach 700° C.

Known in the art are heat resistant thermochromic oxides on the basis of the compounds based on the structures of aluminium-chromium substitution, for instance, rubies and spinels (C. P. Poolle. The optical spectra and color of Chromium containing solids. J. Phys. Chem. Dolids, 25 (1964), 1169).

Thermochromism of art-known compositions of rubies d-elements ($Al_{2-x}Cr_xO_3$) and spinels ($MgAl_{2-x}Cr_xO_4$), as well as of the claimed ones, is stipulated not by the phase transition with the temperature changes, but with the change in ligands field force. Color change takes place with chromium concentration increase on account of aluminium atoms with chromium atoms substitution, which is accompanied by lattice deformation due to greater radius of chromium atoms against aluminium atoms. Hereupon, the phenomenon of such thermochromism is known for chromium only.

If chromium concentration in these compounds is not high, they have pink color. At high chromium concentrations the color of these compounds is green. Pink crystals have thermochromism: upon heating their color gradually changes from pink at low temperatures to green at high temperatures. However, this change takes place very slowly within wide range of temperatures from 200 to 900° C. Within the range of temperatures from room temperature to about 400° C., which is the most substantial for warning a customer, change of color in rubies and spinels is not sufficient for using them as thermochromic components of the coatings.

Thermochromic component disclosed in this work have the feature of reversibly changing their color within wide range of temperatures and in such way that temperature change by 100 becomes visible, hereupon, the coatings based on them have thermal stability of up to 700° C.

Here for the first time not only the above features have been found, but for the first time such solid compounds have been found which manifest strong contrast color change with the temperature and are stable in the air at the temperature up to 700° C.

The above compounds were obtained by a standard method of pressing the mixture of initial oxides followed by heat treatment at 700–1100° C. for 4–100 hours, depending on the composition. Phase composition of the resultant compounds was defined by x-ray phase analysis on difractometer DRON-2, chemical composition was controlled by x-ray spectral analysis.

Thermochromic features of the resultant thermochromic compounds were tested, taking spectra of powders diffusion reflection with respect to temperature, which was changed within the range from room to 400° C. For measurement purposes spectrophotometer SF-26 was used provided with a special cell with a heater, arranged in spectrophotometer in place of standard holder for powder samples. Shift of the diffusion absorption band or change in spectrum shape indicated thermochromic effect.

Coating thermochromic properties may be characterized by two methods depending on the type of diffusion spectrum and its behavior upon temperature variations of the sample:

1. Speed of color change with temperature. Coating color is characterized by a point with coordinates (x, y) on the color graph (color triangle), which are calculated from the reflection spectrum (M. M. Gurevich, E. F. Itsko, M. M. Seredenko. Optic properties of varnish-paint coatings. "Khimiya", L. 1984). Thermochromism rate may be characterized with a velocity of this point along the color graph with temperature, i.e. the value $$TX = \frac{\partial \sqrt{x_2 + y_2}}{\partial T}.$$

An ordinary specialist is capable of distinguishing up to ten thousand colors if he compares two colors between them. It means, if $TX \approx 2 \times 10^{-4}$, the operator can see the difference in temperatures between cool and hot surfaces of about 100° C. For cadmium sulfide applied according to the above mentioned USA patents this value is about $3 \times 10^{-4}$. The advantage of estimating thermochromic features by this method consists in its absolute nature: the basis for comparing different coatings is their color. However, this method is labor consuming, since its practicing requires integration of sophisticated functions along the whole spectrum. Moreover, an operator eye feels color changes differently in different ranges of the spectrum: smaller TX values are seen in the range of blue colors, bigger—in red.

2. In many cases changes of reflection spectrum take place gradually as the edge of absorption shifts upon heating, in most cases towards the long wave area of the spectrum. Such behavior of the reflection spectrum is specific for semiconductors, for instance, for cadmium, zinc and mercury sulfides and selenides used as thermochromic component (see the above mentioned USA patents). In the temperature range of from room and above position of the absorption edge (or the same, edges of diffuse reflectance) is linear dependent on the temperature, if expressed in energy units:

$$E(T) = E(T_0) - \beta(T - T_0),$$

wherein $\beta$ is the temperature coefficient characterizing absorption edge shift with temperature. Thermochromic properties of the compound are expressed the stronger the greater is $\beta$ value. For cadmium sulfide, for instance, this value is:

$$\beta = 7 \times 10^{-4} eV/K.$$

After estimation of thermochromic properties of the compounds their powders were mixed with a binder selected from silicates, phosphates, borates and mixtures thereof, the total ratio of thermochromic component to binder being from 2:98 to 98:2, doped with water and the resultant composition was applied onto the surface of glass, metal, or glass-ceramic. For improving cohesion of the coating with the glass-ceramic, glass or ceramic the latter was roughed by abrasive powder treatment or by means of groove cutting with the help of a disc. Plate with the coating applied thereon was placed into stove and heated to a temperature of from 500 to 970° C. for 10 minutes to 1 hour depending on the compounds composition. Thereafter, spectra of coating diffuse reflectance depending on temperature were tested.

Results of the spectral assays indicate that the claimed metal oxides and the coatings on the basis thereof have thermochromic properties, expressed in reversible, strong and contrast color change upon change of the temperature from room temperature to 400° C., staying stable upon heating up to 700° C., hereupon, temperature change by 100° C. becomes visible.

The essence of this invention is better disclosed in the Examples below, which do not restrict the scope of rights and are of mere illustrative nature.

EXAMPLE 1

Figure 1:
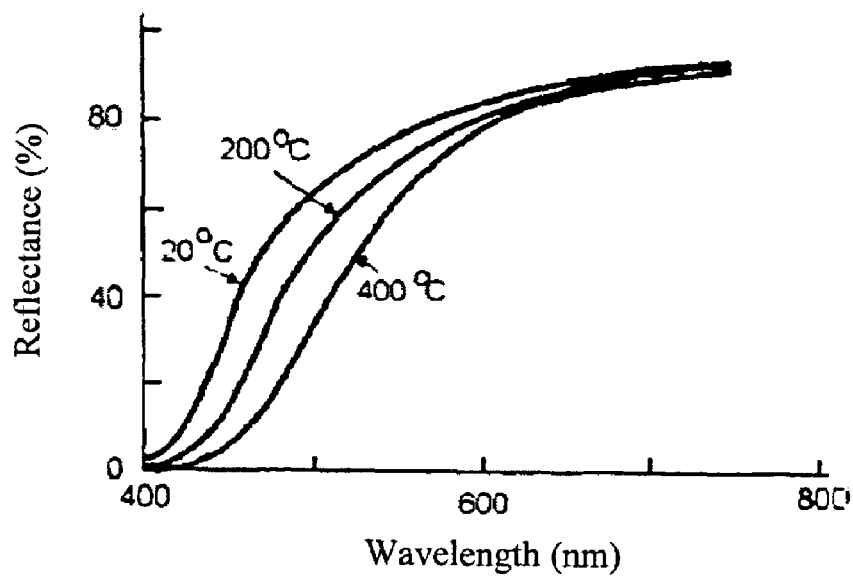
FIG. 1 discloses the reflectance spectrum of the coating obtained in Example 1.
Figure 2:
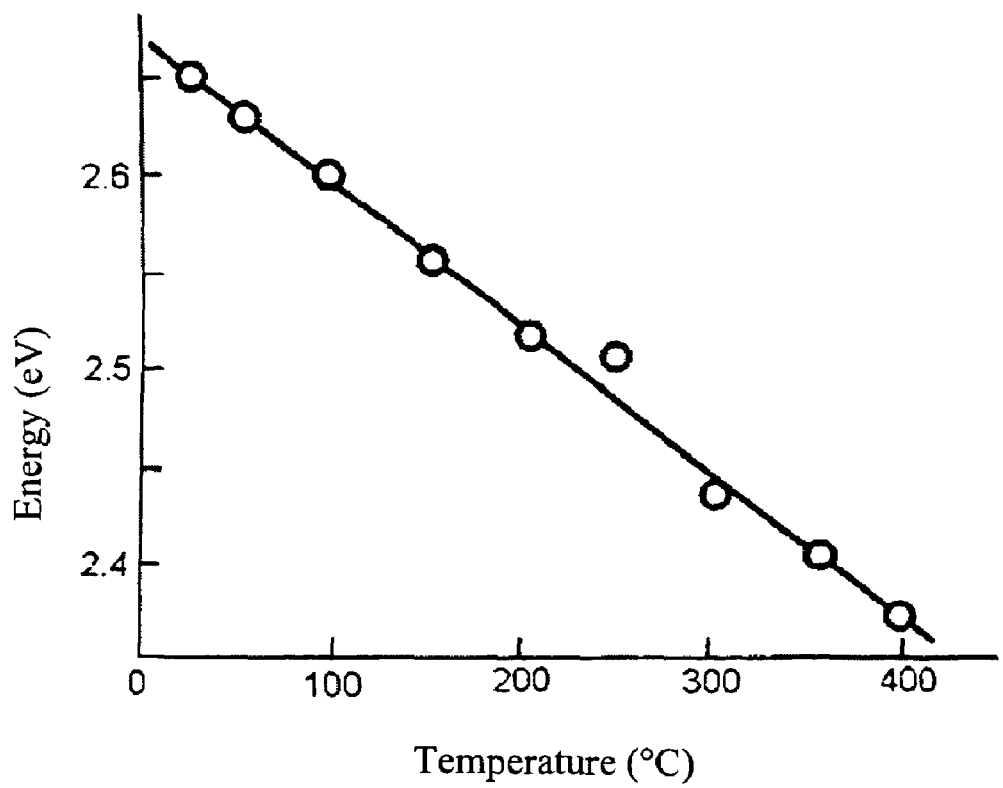
FIG. 2 discloses the dependence of the edge position on the temperature for the coating of Example 1.

This Example illustrates in detail the process for preparing thermochromic coating and the features thereof. Bismuth, lead, tantalum oxide powders were mixed at molar ratio of 1:1:1, total charge mass being 20 grams. The mixture was pressed into a tablet with the help of a hydraulic press at the pressure of about 1000 kg/cm$^2$. The tablet was placed into the oven the temperature of which was being increased gradually from room temperature to 800° C. within five hours. At this temperature the tablet was left for 100 hours. After cooling of the stove the tablet was again grounded into powder, mixed, pressed and again kept for 100 hours at the temperature of 800° C. X-ray phase analysis supports homogeneous nature of the resultant crystalline compound PbO.Bi$_2$O$_3$.Ta$_2$O$_5$. This compound is thermochromic: upon heating from 20 to 400° C. its color changed from light yellow to orange. Powder of this compound was mixed with glass frit of the following composition: 78Ba(PO$_3$)$_2$.22Pb(PO$_3$)$_2$, mass ratio being 90:10, then water was added to the mixture and the resultant composition was applied onto the surface of a glass-ceramic plate. The glass-ceramic plate with the coating applied was placed into the oven, the temperature of which was gradually increased to 500° C., and at this temperature the plate was kept for 1 hour. The coating so obtained had light yellow color. FIG. 1 discloses reflectance spectra, which indicate gradual shift of the absorption edge towards the long wave area of the spectrum upon temperature increase, i.e. the resultant coating has thermochromic properties. As a characteristic of thermochromic properties of the coating it is possible to consider the dependence of the edge position on the temperature, for instance, at the level of reflectance coefficient of 0.5. This dependence is disclosed in FIG. 2. It is evident that position of the claimed coating absorption edge is in linear dependence on the temperature, as it is in semiconducting compounds. Temperature coefficient of the edge shift coefficient of the considered coating is:

$\beta=(7.4\pm0.3)\times10^{-4}$eV/K.

Thermochromism of the coating may be characterized also by the speed of color change TX=2.3 ×10$^{-4}$. These values are comparable with the thermochromism value, which may be attained of the coatings containing cadmium sulfide.

EXAMPLE 2

Similar to Example 1, the compound of the following composition: PbO.Bi$_2$O$_3$.2Ta$_2$O$_5$. The resultant compound was mixed with aluminophosphate binder having approximate final formula Al$_2$O$_3$.3P$_2$O$_5$. Preparation and use of this binder was made in compliance with literature recommendations (M. M. Sychev. Non-organic glues, L. Khymia, 1986). Mass ratio of the binder (recalculated to solid matter) and thermochromic component in the mixture used for coating application was equal to 1:9. The mixture was applied onto the glass-ceramic surface prepared similar to the method disclosed in Example 1. The coating was dried by heating to 450° C. and maintained at this temperature for 1 hour. Properties of the coating were examined by the method similar to one presented in Example 1. According to measurements, the value of temperature coefficient of absorption edge shift for this coating is:

$\beta=(6.7\pm0.4)\times10^{-4}$eV/K.

EXAMPLE 3

All steps were accomplished similar to Examples 1 and 2, but composition of the thermochromic component was PbO.Bi$_2$O$_3$.4Ta$_2$O$_5$, and as the binder magnesium phosphate binder was used which had approximate composition of 2MgO.P$_2$O$_5$, the ratio being 70:30. The coating was heated at 450° C. for 1 hour. The value of temperature coefficient of absorption edge shift for this coating was:

$\beta=(8.2\pm0.3)\times10^{-4}$eV/K.

EXAMPLE 4

Figure 3:
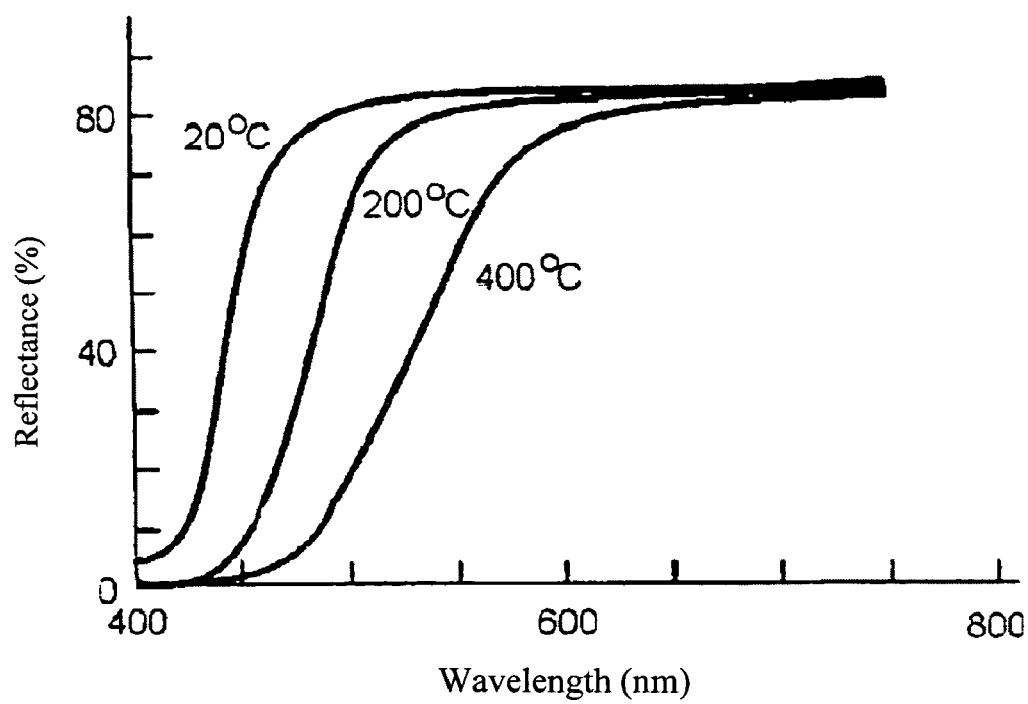
FIG. 3 discloses the reflectance spectrum of the coating of Example 4.
Figure 4:
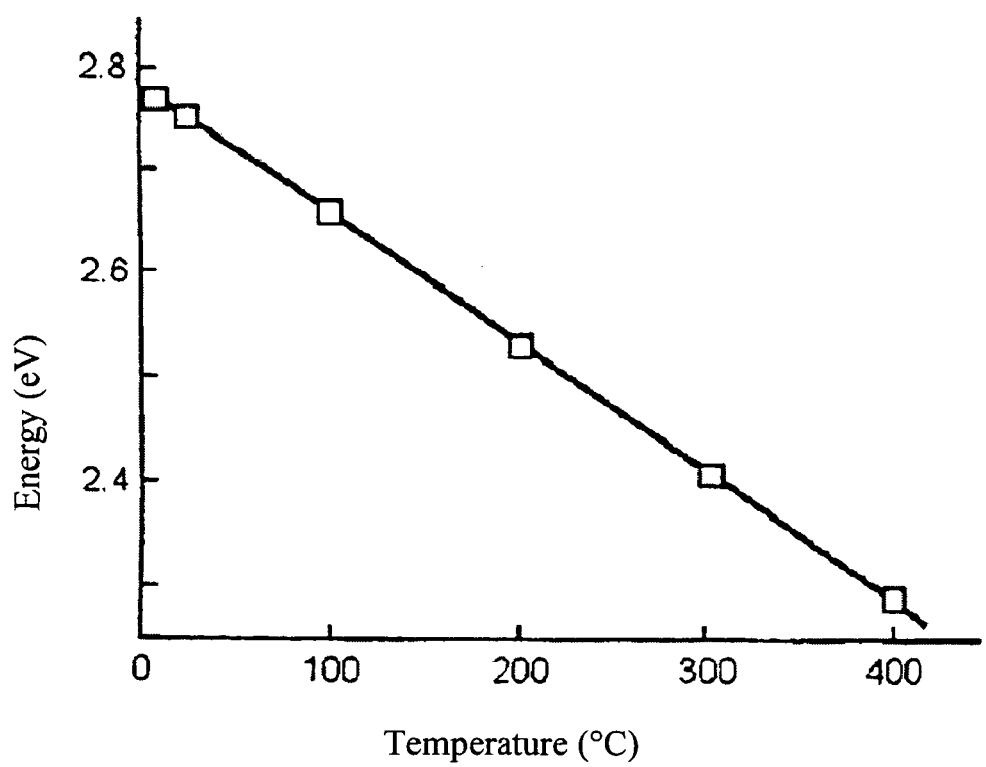
FIG. 4 discloses the dependence of the edge position on the temperature for the coating of Example 4.

This Example illustrates preparation of thermochromic coating on the basis of a compound containing bismuth oxide and having maximum thermochromism value. Using the same synthesis conditions as above in Examples 1 and 2 thermochromic component was obtained with the composition 7Bi$_2$O$_3$.Nb$_2$O$_5$. The coating was applied as in Example 2. Its reflectance spectrum in the temperature range of from room temperature to 400° C. is given in FIG. 3, and temperature reliance of the absorption edge position—in FIG. 4. It is evident that for this particular coating thermochromism value is:

$\beta=12.3\times10^{-4}$eV/K.

It corresponds to color change upon heating from light yellow at room temperature to dark orange at 400° C.

TABLE 1

Thermochromic properties of coatings making use of bismuth oxide compound as a thermochromic component

| COMPOSITION | $\beta \times 10^4$, ev/K |
|---|---|
| $Na_2O\ Bi_2O_3\ Ta_2O_5$ | 5.0 |
| $BaO\ Bi_2O_3\ Ta_2O_5$ | 6.6 |
| $PbO\ Bi_2O_3\ Ta_2O_5 + CuO$ | 5.6 |
| $PbO\ Bi_2O_3\ Ta_2O_5 + NiO$ | 5.5 |
| $(BaNb_2O_6)_{0.6}(Bi_{2/3}Nb_2O_6)_{0.4}$ | 2.5 |
| $CaO\ Bi_2O_3\ Nb_2O_5$ | 5.5 |
| $PbO\ Bi_2O_3\ Nb_2O_5:NiO$ | 5.2 |
| $Bi_2O_3$ | 11.1 |
| $8Bi_2O_3 0.5Cr_2O_3$ | 7.8 |
| $7Bi_2O_3WO_3$ | 12.0 |
| $15Bi_2O_3Li_2O$ | 11.3 |
| $Bi_2O_3 4Ta_2O_5$ | 3.1 |
| $CaO3.3Bi_2O_3$ | 9.4 |
| $7CaO3Bi_2O_3$ | 7.5 |
| $7Bi_2O_3CrO_3$ | 9.1 |
| $4Bi_2O_3CrO_3$ | 8.0 |
| $K_2O\ Bi_2O_3\ Ta_2O_5$ | 6.8 |
| $PbO\ Bi_2O_3\ Ta_2O_5$ | 7.4 |
| $PbO\ Bi_2O_3\ Ta_2O_5 + Fe_2O_3$ | 5.3 |
| $PbO(Bi_2O_3)_{1/3}Nb_2O_6$ | 4.0 |
| $Ba_2BiNbO_6$ | 6.6 |
| $PbO\ Bi_2O_3\ Nb_2O_5$ | 6.5 |
| $0.98Bi_2O_3 0.02Cr_2O_3$ | 7.6 |
| $Bi_2O_3WO_3MoO_3$ | 7.1 |
| $Bi_2O_3 2WO_3$ | 9.2 |
| $Bi_2O_3 MoO_3$ | 7.8 |
| $15Bi_2O_3Na_2O$ | 11.4 |
| $Bi_2O_3 3Ta_2O_5$ | 5.4 |
| $7CaO5Bi_2O_3$ | 9.1 |
| $3Bi_2O_3CrO_3$ | 6.9 |
| $8Bi_2O_3CrO_3$ | 9.4 |
| $2Bi_2O_3 3SnO_2$ | 4.1 |
| $CaO\ Bi_2O_3\ Ta_2O_5$ | 6.2 |
| $PbO\ Bi_2O_3\ Ta_2O_5 + CoO$ | 3.2 |
| $PbO\ Bi_2O_3\ Ta_2O_5 + Nb_2O_3$ | 6.4 |
| $(Bi_2O_3)_{1/3}Nb_2O_5$ | 5.5 |
| $ZnO\ Bi_2O_3\ Nb_2O_5$ | 5.5 |
| $(ZnO)_{0.9}(NiO)_{0.1}Bi_2O_3Nb_2O_5$ | 5.2 |
| $0.94Bi_2O_3 0.06Cr_2O_3$ | 7.8 |
| $Bi_2O_3 3WO_3$ | 9.0 |
| $Bi_2O_3 WO_3$ | 8.7 |
| $7Bi_2O_3MoO_3$ | 11.4 |
| $2Bi_2O_3 3Ta_2O_5$ | 8.3 |
| $SrOBi_2O_3$ | 7.2 |
| $5CaO7Bi_2O_3$ | 8.2 |
| $5Bi_2O_3CrO_3$ | 8.5 |
| $3Bi_2O_3WO_3$ | 8.6 |
| $2Bi_2O_3 3ZrO_2$ | 7.1 |

Table 1 summarizes temperature coefficient values of the absorption layer shift for the coatings created on the basis of other 48 compounds comprising in its composition bismuth oxide. All of them are thermochromic, and their thermochromism relies upon the absorption edge shift to long-wave area of the spectrum upon heating.

EXAMPLE 5

This Example illustrates application of chromates as a component of thermochromic coatings. Pouring together equivalent amounts of potassium chromate and Barium chloride resulted in Barium chromate residue of bright yellow color. The residue was filtered and mixed with borosilicate frit of glass enamel TIT24, the ratio being 30:70.

Figure 5:
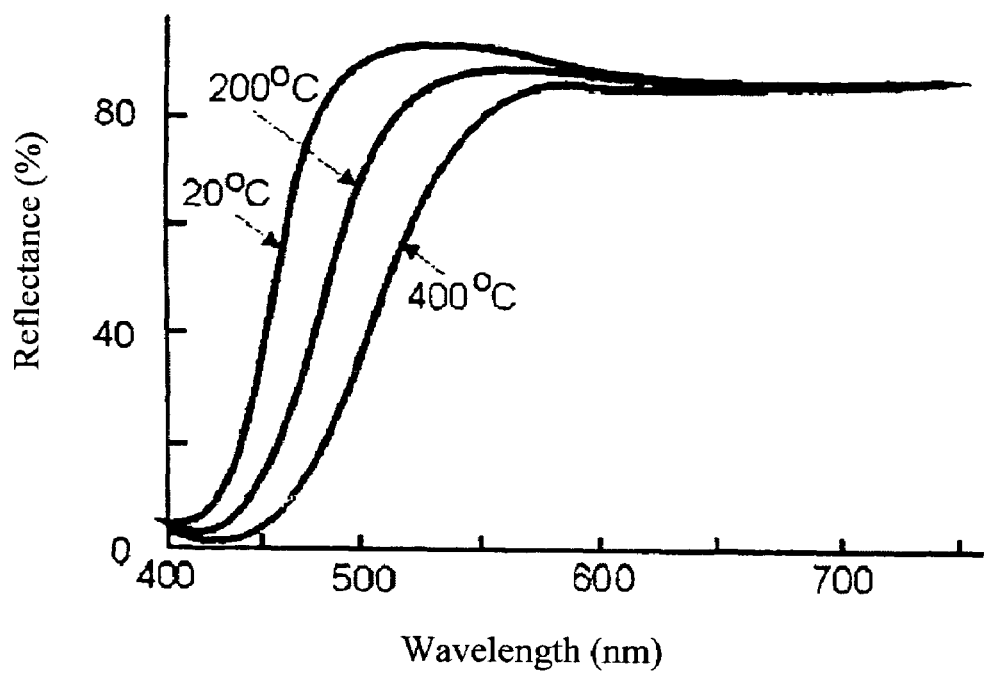
FIG. 5 discloses the reflectance spectrum of the coating of Example 5.
Figure 6:
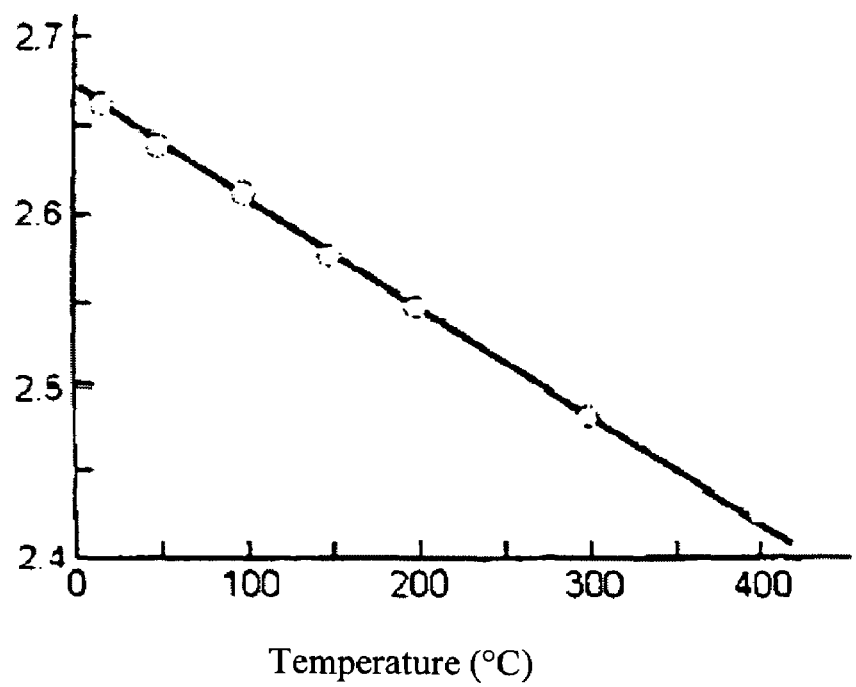
FIG. 6 discloses the dependence of the edge position on the temperature for the coating of Example 5.

After adding water the resultant mixture was deposited onto the surface of a glass plate used as the initial material for obtaining glass-ceramic tile. The glass plate was placed into the ceramming oven, wherein the maximum temperature was 970° C., and maintenance at this temperature was 30 minutes. Coating reflectance spectra are given in FIG. 5, and temperature reliance of the absorption edge—in FIG. 6. The resultant coating has yellow color with greenish tint at room temperature. Coating color changes to bright orange upon temperature increase from room temperature to 400° C.

Thermochromic properties of the coatings based on other chromate's are given in Table 2.

TABLE 2

Thermochromic properties of the coatings containing a chromate as a thermochromic component

| COMPOSITION | $\beta \times 10^4$, ev/K |
|---|---|
| $2BaO.CrO_3$ | 5.8 |
| $2ZnO.CrO_3$ | 6.2 |
| $SrCrO_4$ | 6.7 |
| $PbCrO_4$ | 5.8 |
| $2CaO.CrO_3$ | 5.8 |
| $CaCrO_4$ | 7.6 |
| $KAl(CrO_4)_2$ | 6.4 |
| $2SrO.CrO_3$ | 6.1 |
| $3BaCrO_4.BaSO_4$ | 5.8 |
| $K_2CrO_4$ | 4.1 |

EXAMPLE 6

This Example illustrates the use of metal niobates, tantalates, molibdates and tungstates as thermochromic component, except tin niobate and tantalate. Lead and Niobium oxides weight of 20 g taken in the quantities corresponding to molar ratio of 1:1 were pressed into a tablet and annealed at 800° C. for 100 hours. After annealing the tablet was ground, mixed and annealed again at 800° C. for 100 hours. After annealing the tablet was grounded. 9.5 g of the powder of the resultant thermochromic compound was mixed with 0.4 g of potassium silicate and 0.1 g of boric acid. The resultant mixture was mixed in water and deposited onto the surface of a ceramic plate, and the plate was annealed at 450° C. The coating had light yellow color, which becomes dark yellow at 400° C. Temperature coefficient value $\beta=4.2\times 10^{-4}$. Coatings based on tin compounds were applied in the same way, but all operations connected with preparation of thermochromic component and annealing of the coating were carried out in vacuum.

Table 3 presents temperature coefficient values of absorption edge shift of coatings based on niobium, tantalate, molybdenum, tungsten oxides and oxides of heavy metals. All these coatings may be prepared by the method disclosed in Example 6.

TABLE 3

Thermochromic properties of niobates, tantalates, molibdates and tungstates of heavy metals used as thermochromic component

| COMPOSITION | $\beta \times 10^4$, ev/K |
|---|---|
| $SnNb_2O_6$ | 6.4 |
| $PbO2Ta_2O_5$ | 2.7 |
| $PbOTa_2O_5$ | 8.0 |
| $2PbOTa_2O_5$ | 6.9 |
| $2Ga_2O_3.Ta_2O_5$ | 4.1 |
| $TiO_2.2WO_3$ | 5.3 |
| $ZrO_2.2Nb_2O_5$ | 2.1 |
| $PbWO_4$ | 7.0 |
| $Pb_{0.8}Mg_{0.2}WO_4$ | 4.6 |
| $ZnWO_4$ | 2.7 |
| $KGa(WO_4)_2$ | 4.8 |

TABLE 3-continued

Thermochromic properties of niobates, tantalates, molibdates and tungstates of heavy metals used as thermochromic component

| COMPOSITION | $\beta \times 10^4$, ev/K |
|---|---|
| $KNbO_3$ | 2.8 |
| $2ZnO\ Nb_2O_5$ | 5.8 |
| $2PbO Nb_2O_5$ | 4.4 |
| $SnTa_2O_6$ | 7.8 |
| $BaNb_2O_6$ | 3.2 |
| $CuNb_2O_6$ | 3.4 |
| $AlNbO_4$ | 3.0 |
| $WO_3$ | 7.1 |
| $BaMoO_4$ | 2.2 |
| $ZnMoO_4$ | 2.0 |
| $CaWO_4$ | 3.9 |

TABLE 4

Thermochromic properties of cobalt, nickel, manganese and copper compounds

| COMPOUND | Color at T = 20° C. | $TX \times 10^{-4}$ |
|---|---|---|
| $CoNb_2O_6$ | blue | 1.8 |
| $CoTa_2O_6$ | pink | 1.4 |
| $CoMoO_4$ | violet | 1.2 |
| $Co_{0.8}Mg_{0.2}WO_4$ | blue | 2.0 |
| $Co_{0.4}Mg_{0.6}WO_4$ | blue | 1.8 |
| $Co_{0.9}Pb_{0.1}WO_4$ | dark-blue | 3.2 |
| $Co_{0.6}Zn_{0.4}WO_4$ | bright-blue | 3.4 |
| $Mn_{0.1}Zn_{0.9}MoO_4$ | orange | 1.3 |
| $NiWO_4$ | yellowish-green | 1.1 |
| $NiMoO_4$ | green | 1.1 |
| $NiTa_2O_6$ | yellowish-green | 1.2 |
| $CuMoO_4$ | yellow | 1.4 |
| $CuWO_4$ | brownish-yellow | 1.5 |

According to the claimed invention niobates, tantalates, tungstates and molibdates colored with transition metals ions, for instance, cobalt, copper, chromium, nickel, manganese may also be used as thermochromic component in the coatings. Upon heating these compounds their color changes on account of the absorption edge shift and on account of absorption band shape changes. The Examples given below demonstrate the process of preparing thermochromic coatings, in which as the thermochromic component non-organic compounds are used, the coloring of these compounds relies upon transition metals ions present therein.

EXAMPLE 7

Figure 7:
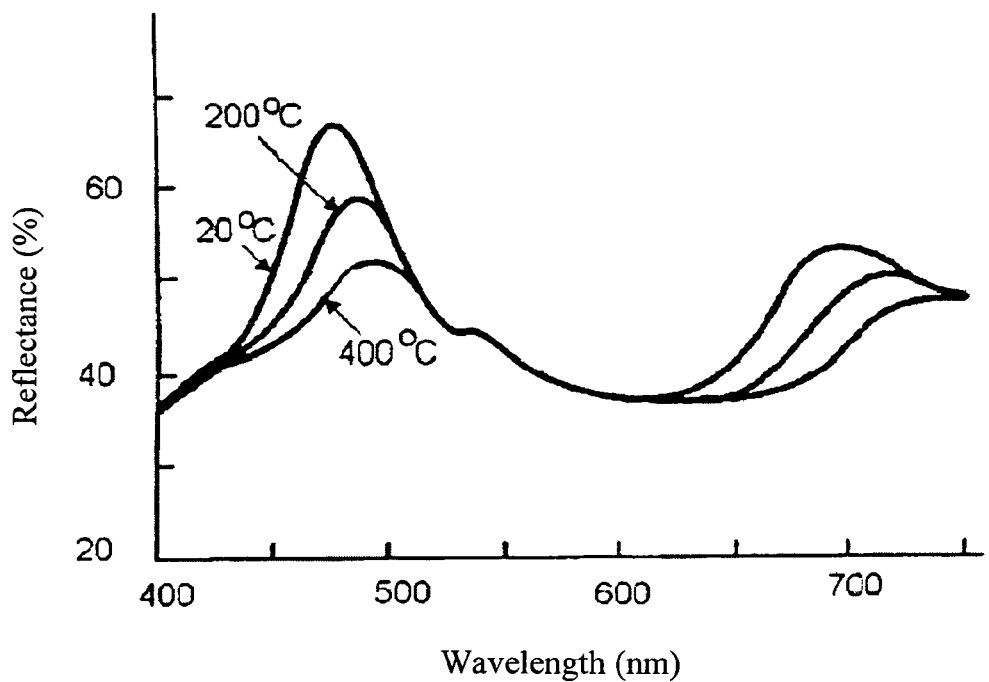
FIG. 7 discloses the reflectance spectrum of the cobalt tungstenate coating of Example 7.
Figure 8:
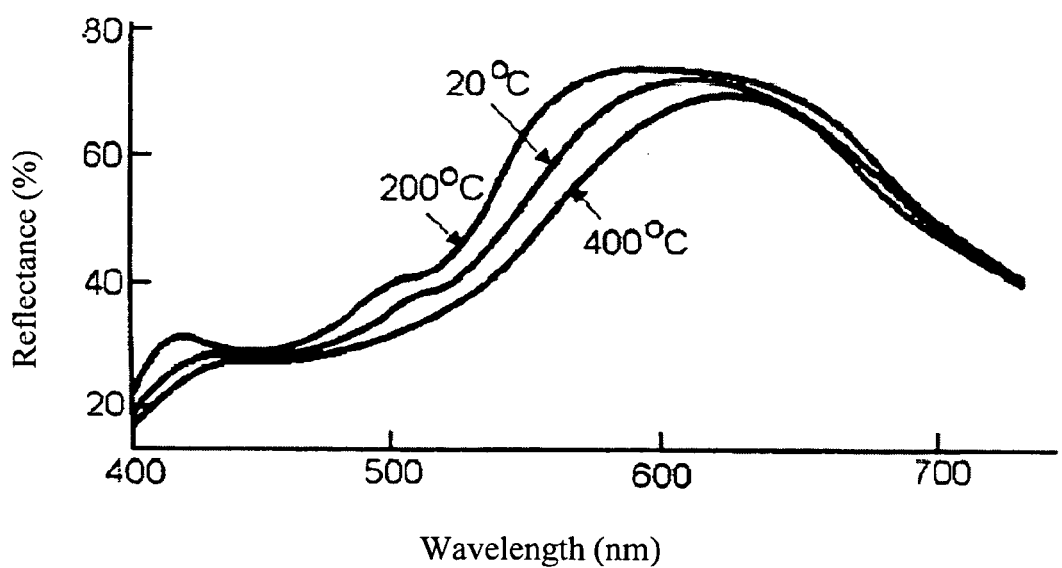
FIG. 8 discloses the reflectance spectrum of the nickel molibdate coating of Example 7.

20 g of thoroughly ground mixture of the base cobalt carbonate and tungsten oxide taken in molar ratio of 1:1 were placed into the oven heated to 800° C. The sample was exposed at this temperature for 30 hours, and thereafter the temperature was raised to 1000° C., exposure at this temperature was also 30 hours. The coating was applied with the use of potassium silicate as the binder, the ratio of thermochromic pigment versus binder being 95:5. Reflectance spectrum of the coating is given in FIG. 7. It is evident from the spectrum that, upon heating the coating containing cobalt tungstate as thermochromic component, the change in color is connected with the absorption edge overlapping the transparency band in the reflectance spectrum in the blue area of spectrum and broadening of the cobalt absorption band in the green area of the spectrum. Coating color changes from dark blue at room temperature to dark yellow at 400° C. Thermochromism value calculated on the basis of color measurements to minimal and maximal temperatures is equal to $TX=2.8 \times 10^{-4}$. Color contrast of cobalt tungstate may be improved by means of diluting the cobalt with other bivalent metals such as calcium, magnesium, zinc. Thermochromic properties have also appropriate compounds of nickel, copper and manganese, they may also be used for preparation of the coatings claimed under this invention. Table 4 gives thermochromism values calculated from reflectance spectra of the coatings which contain as the thermochromic component one of the above mentioned compounds, and in FIG. 8 as an Example, reflectance spectrum of the coating on the basis of nickel molibdate.

Figure 9:
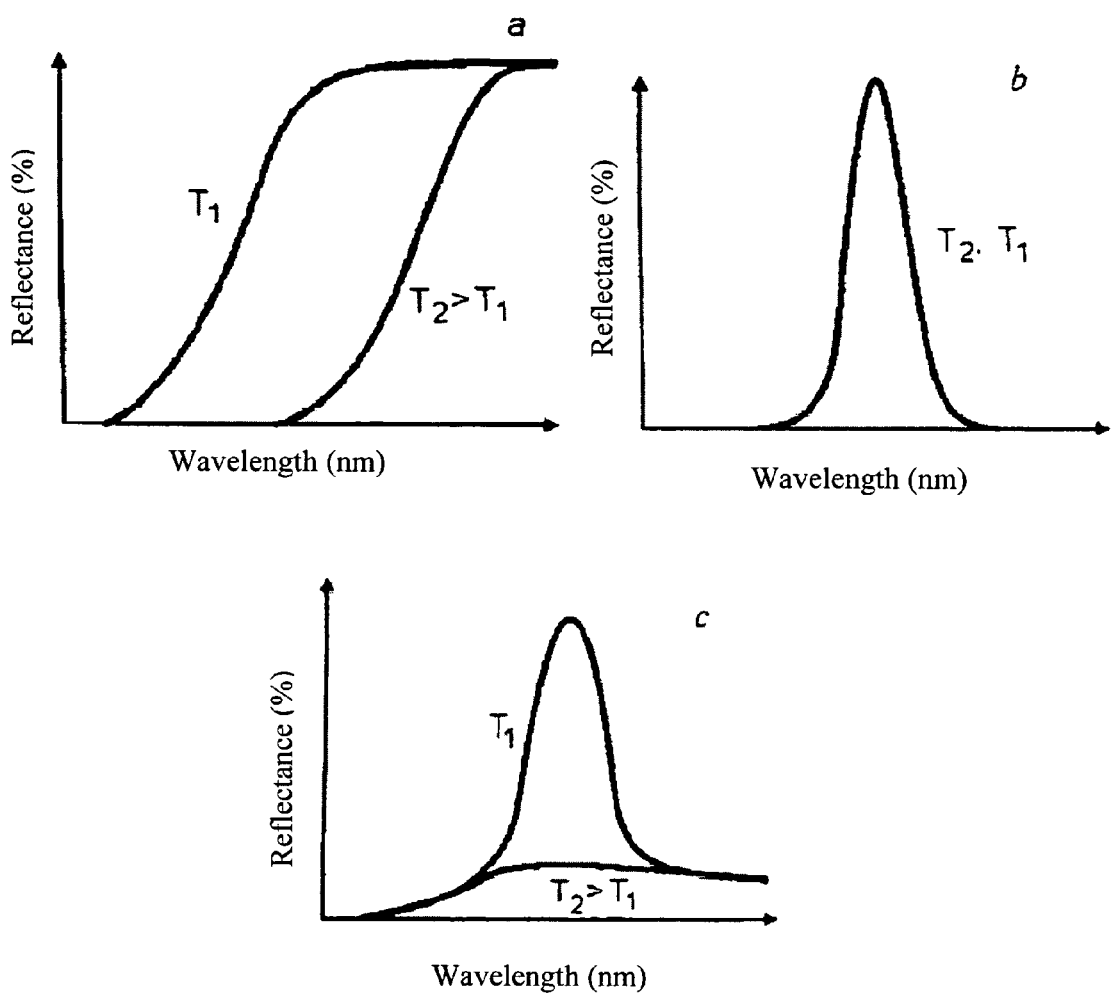
FIG. 9 illustrates the effects of a mixture of thermochromatic compound and a pigment on the reflectance spectrum of a coating.

According to the invention more intensive color change may be attained if the thermochromic compound includes, at least, two components with definite ratio of reflectance spectra. The principle consists in the following. Let the coating have within its composition a thermochromic compound characterized by gradual shift of absorption edge towards the long-wave area of spectrum, as it is in the above Examples. Moreover, the coating contains a pigment which may have no thermochromic properties at all, and in which the reflectance maximum resides in the same spectral area where thermochromic component edge shift occurs (FIG. 9, *b*). Reflectance spectrum of the mixture in this case will be the superposition of reflectance spectra of two compounds (FIG. 9, *c*). In the initial position pigment reflectance band will be distinguishable on the mixture reflectance spectrum, since at low temperature it is in the area of thermochromic component transparency. Upon heating the thermochromic component absorption edge shifts towards the long-wave area of spectrum and starts absorption in the pigment reflectance area. Eventually reflectance intensity in this spectral area falls to background level. This effect corresponds to color variation from shade of color of the colored pigment to the color of thermochromic component at high temperature. Naturally, thermochromism will be still higher if the colored pigment is also thermo-chromic, for instance, the proposed in this invention compounds of zinc and cobalt.

The Examples given below, demonstrate embodiment of the claimed compound.

EXAMPLE 8

Figure 10:
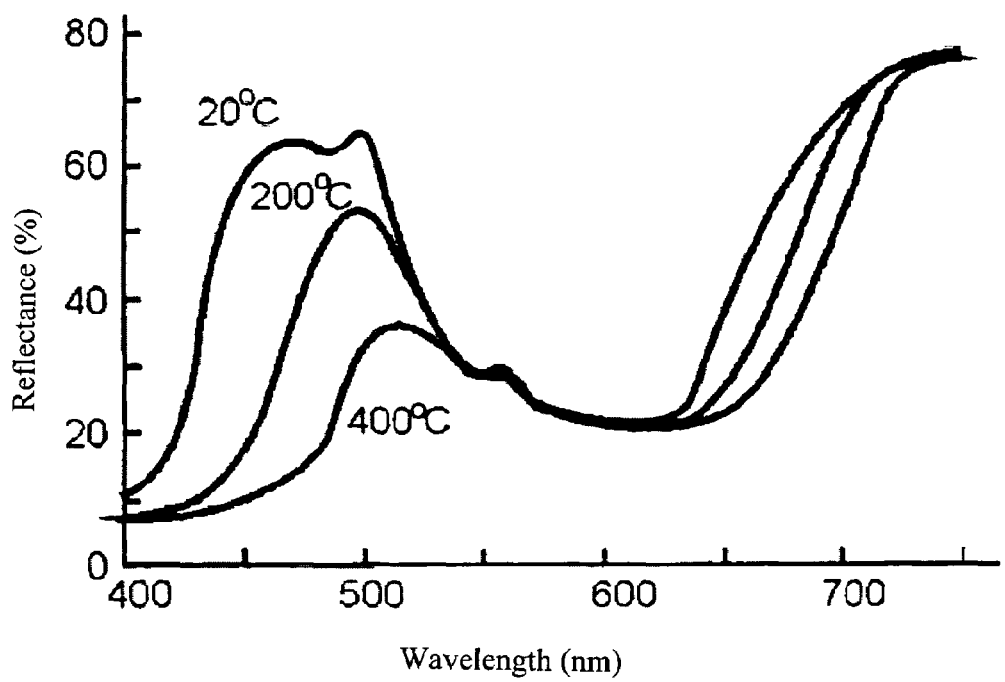
FIG. 10 discloses the reflectance spectrum of the coating of Example 8.

15 g of bismuth oxide pre-annealed in air at 700° C., is mixed with 1 g of commercial heat-stable blue pigment—cobalt blue ($CoAl_2O_4$) and 0.3 g of potassium silicate is added as the binder. The mixture is vigorously stirred, water is added and deposited onto a metallic surface and dried. Reflectance spectra of the resultant material are given in FIG. 9. The color of coating changes from blue at room temperature to orange at 400° C. Thermochromism rate calculated on the basis of the data given in FIG. 10, is $TX=6.0 \times 10^{-4}$. Hence, mixing of thermochromic component—bismuth oxide—with non-thermochromic pigment—cobalt blue, led to intensification of thermochromism twice as much in comparison with the thermochromism of pure bismuth oxide.

EXAMPLE 9

10 g of thermochromic compound $PbO \cdot Bi_2O_3 \cdot Ta_2O_5$, obtained by the method disclosed in detail in Example 1, was mixed with 10 g of commercial blue-green glass C3C18 (non-thermochromic component), 0.2 g of sodium silicate is added. The resultant mixture is vigorously mixed and deposited onto a ceramic surface. The plate with coating was dried and exposed to 700° C. for 30 minutes. Coating color changes upon heating from gray-blue to gray-yellow. Thermochromism rate calculated on the basis of temperature reliance of the reflectance spectra was 2.8, which is 25% higher than thermochromism of the initial compound.

EXAMPLE 10

Figure 11:
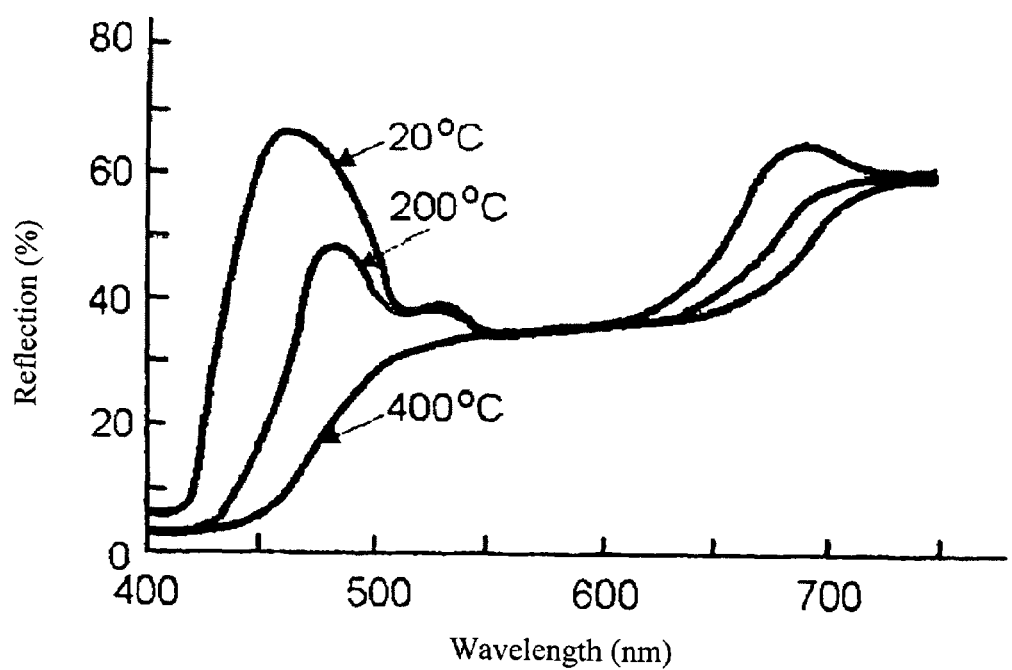
FIG. 11 discloses the reflectance spectrum of the coating of Example 10.

10 g of thermochromic compound $Co_{0.6}Zn_{0.4}WO_4$ obtained by the method disclosed in Example 7, was mixed with 10 g of another thermochromic component—$7Bi_2O_3 \cdot O_3$ prepared as in Example 4, 0.4 g of binder—sodium tetraborate is added. The mixture was diluted with water and deposited onto a ceramic surface. The coating was dried and heated at 550° C. for 1 hour. Reflectance spectra of the coating are given in FIG. 11. Thermochromism rate of the mixture is $7.9 \times 10^{-4}$, which was more than twice exceeding the thermochromism of individual compounds.

The invention claimed is:

1. A thermochromic material comprising a thermochromic component and a binder, wherein the thermochromic component is crystal phases based on oxides of heavy metals of I, II, III, IV, V, VI, VII, VIII groups of the Periodic System selected from the group consisting of compounds of the following general formulae:
   (i) $(Bi_2O_3)_{1-z}(M_xO_y)_z$ where $z=0-0.5$, wherein M is selected from the group consisting of heavy, alkali, alkaline earth metals and mixtures thereof;
   (ii) $(M_xO_y)_m(Bi_2O_3)_n Nb(Ta)_2O_5$, where $m=0-1$, $n=1-2$, wherein M is selected from the group consisting of heavy, alkali, alkaline earth metals and mixtures thereof;
   (iii) $(M_xO_y)_m(Bi_2O_3)_n Mo(W)O_3$ where $m=0-1$, $n=0-12$, wherein M is selected from the group consisting of alkali, alkaline earth, heavy metals and mixtures thereof;
   (iv) $(M_xO_y)_m(Me_xO_y)_n Mo(W)O_3$ where $m=0-1$, $n=0-1$, wherein M is selected from the group consisting of alkali, alkaline earth, heavy metals and mixtures thereof, and Me is a heavy metal;
   (v) $(M_xO_y)_m(Me_xO_y)_n Nb(Ta)_2O_5$, where $m=0-1$, $n=0-1$, and $n>0$, wherein M is selected from the group consisting of alkali, alkaline earth, heavy metals and mixtures thereof, and Me is selected from the group consisting of Cu(II), Mn(II), Mn(III), Co(II), Ni(II) and Cr(III),
   the ratio in terms of weight percentage of thermochromic component versus binder being from 2:98 to 98:2.

2. A material according to claim 1, wherein the thermochromic component additionally comprises a thermostable component which is non-thermochromic or thermochromic pigment, wherein the area of maximum diffusion reflection of the thermostable component lies in the same or is close to the spectral area where the temperature related change of diffusion reflection spectrum of the basic thermochromic component lies.

3. A material according to claim 2, wherein the ratio of thermochromic component to heat stable component is within the range of from 50:1 to 1:30.

4. A material according to claim 1, wherein the binder is selected from the group consisting of silicates, borates, alkali or alkaline earth phosphates, and mixtures thereof.

5. An article comprising the thermochromic material in accordance with claim 1.

6. A material according to claim 1, wherein the thermochromic component additionally comprises a thermostable component which is non-thermochromic or thermochromic pigment, wherein the area of maximum diffusion reflection of the thermostable component lies in the same or is close to the spectral area where the temperature related change of diffusion reflection spectrum of the basic thermochromic component lies.

7. A material according to claim 6, wherein the ratio of thermochromic component to heat stable component is within the range of from 50:1 to 1:30.

8. A material according to claim 1, wherein the binder is selected from the group consisting of silicates, borates, alkali or alkaline earth phosphates, and mixtures thereof.

9. A thermochromic material comprising a thermochromic component and a binder, wherein the thermochromic component is crystal phases based on oxides of heavy metals of I, II, III, IV, V, VI, VII, VIII groups of the Periodic System selected from the group consisting of compounds of the following general formulae:
   (ii) $(M_xO_y)_m(Bi_2O_3)_n Nb(Ta)_2O_5$, where $m=0-1$, $n=1-2$, wherein M is selected from the group consisting of heavy, alkali, alkaline earth metals and mixtures thereof;
   (iii) $(M_xO_y)_m(Bi_2O_3)_n Mo(W)O_3$ where $m=0-1$, $n=0-12$, wherein M is selected from the group consisting of alkali, alkaline earth, heavy metals and mixtures thereof;
   (iv) $(M_xO_y)_m(Me_xO_y)_n Mo(W)O_3$ where $m=0-1$, $n=0-1$, wherein M is selected from the group consisting of alkali, alkaline earth, heavy metals and mixtures thereof, and Me is a heavy metal;
   (v) $(M_xO_y)_m(Me_xO_y)_n Nb(Ta)_2O_5$, where $m=0-1$, $n=0-1$, and $n>0$ wherein M is selected from the group consisting of alkali, alkaline earth, heavy metals and mixtures thereof, and Me is selected from the group consisting of Cu(II), Mn(II), Mn(III), Co(II), Ni(II) and Cr(III),
   the ratio in terms of weight percentage of thermochromic component versus binder being from 2:98 to 98:2.

10. A material according to claim 9, wherein the thermochromic component additionally comprises a thermostable component which is non-thermochromic or thermochromic pigment, wherein the area of maximum diffusion reflection of the thermostable component lies in the same or is close to the spectral area where the temperature related change of diffusion reflection spectrum of the basic thermochromic component lies.

11. A material according to claim 10, wherein the ratio of thermochromic component to heat stable component is within the range of from 50:1 to 1:30.

12. A material according to claim 9, wherein the binder is selected from the group consisting of silicates, borates, alkali or alkaline earth phosphates, and mixtures thereof.

13. An article comprising the thermochromic material in accordance with claim 9.

14. A material according to claim 9, wherein the thermochromic component additionally comprises a thermostable component which is non-thermochromic or thermochromic pigment, wherein the area of maximum diffusion reflection of the thermostable component lies in the same or is close to the spectral area where the temperature related change of diffusion reflection spectrum of the basic thermochromic component lies.

15. A material according to claim 14, wherein the ratio of thermochromic component to heat stable component is within the range of from 50:1 to 1:30.

16. A material according to claim 9, wherein the binder is selected from the group consisting of silicates, borates, alkali or alkaline earth phosphates, and mixtures thereof.

* * * * *